United States Patent
Clemm (10) Patent No.: US 10,968,958 B2
(45) Date of Patent: Apr. 6, 2021

(54) BALL CAGE FOR CROSS-GROOVE TYPE PLUNGING AND FIXED CONSTANT VELOCITY JOINTS

(71) Applicant: Volkswagen Aktiengesellschaft, Wolfsburg (DE)

(72) Inventor: Oliver Clemm, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 391 days.

(21) Appl. No.: 16/011,054

(22) Filed: Jun. 18, 2018

(65) Prior Publication Data

US 2018/0363712 A1 Dec. 20, 2018

(30) Foreign Application Priority Data

Jun. 16, 2017 (DE) ................. 10 2017 210 135.0

(51) Int. Cl.
*F16D 3/227* (2006.01)
*F16D 3/226* (2006.01)
*F16D 3/223* (2011.01)

(52) U.S. Cl.
CPC .......... *F16D 3/227* (2013.01); *F16D 3/2265* (2013.01); *F16D 2003/22303* (2013.01); *F16D 2003/22309* (2013.01); *F16D 2300/10* (2013.01); *Y10S 464/906* (2013.01); *Y10T 29/49691* (2015.01)

(58) Field of Classification Search
CPC .................. F16D 3/227; F16D 3/2265; F16D 2003/22309; F16D 2300/10; F16D 2003/22303; F16D 3/223; Y10T 29/49691; Y10S 464/906

USPC ................................................. 464/144, 145
See application file for complete search history.

(56) References Cited

U.S. PATENT DOCUMENTS

| | | | |
|---|---|---|---|
| 2,150,942 A * | 3/1939 | Rzeppa ................. | F16D 3/2265 464/906 |
| 4,820,240 A | 4/1989 | Girguis | |
| 4,878,882 A | 11/1989 | Welschof et al. | |
| 5,647,800 A | 7/1997 | Warnke et al. | |
| 6,461,244 B2 * | 10/2002 | Meyer ..................... | F16D 3/224 464/906 |
| 6,497,622 B1 | 12/2002 | Bilz et al. | |
| 7,232,373 B2 | 6/2007 | Hildebrandt et al. | |
| 7,704,149 B2 * | 4/2010 | Yamazaki ............. | F16D 3/2245 464/906 |
| 9,255,611 B2 | 2/2016 | Fujio | |

(Continued)

FOREIGN PATENT DOCUMENTS

| | | |
|---|---|---|
| CN | 103562579 A | 2/2014 |
| DE | 3710572 A1 | 10/1988 |
| DE | 3233753 C2 | 6/1990 |

(Continued)

*Primary Examiner* — Greg Binda
(74) *Attorney, Agent, or Firm* — Muncy, Geissler, Olds & Lowe, P.C.

(57) ABSTRACT

A ball cage for universal use both in a cross-groove type plunging constant velocity joint and in a cross-groove type fixed constant velocity joint has an external contour with sections of different curvature. Axial edge sections of the external contour are designed as spherical sections located on the circumference of an imaginary sphere, whereas a center section of the external contour located axially between the edge sections runs radially inside the diameter of the imaginary sphere.

11 Claims, 4 Drawing Sheets

(56) References Cited

U.S. PATENT DOCUMENTS

2005/0101391 A1* 5/2005 Ingalsbe .................. F16D 3/223
2006/0252558 A1 11/2006 Hildebrandt et al.

FOREIGN PATENT DOCUMENTS

| DE | 4228230 A1 | 3/1993 |
| DE | 195 07 859 A1 | 9/1996 |
| DE | 19956672 C1 | 9/2001 |
| DE | 102 50 419 B3 | 8/2004 |
| DE | 102004031154 A1 | 5/2005 |
| DE | 10353608 A1 | 6/2005 |
| DE | 10352408 A1 | 7/2005 |
| DE | 102006016843 A1 | 10/2007 |
| DE | 102007059379 A1 | 6/2009 |
| DE | 102008008212 A1 | 8/2009 |
| DE | 102013003859 A1 | 9/2014 |
| GB | 978230 | * 12/1964 .................. 464/145 |

* cited by examiner

BALL CAGE FOR CROSS-GROOVE TYPE PLUNGING AND FIXED CONSTANT VELOCITY JOINTS

This nonprovisional application claims priority under 35 U.S.C. § 119(a) to German Patent Application No. 1 2017 210 135.0, which was filed in Germany on Jun. 16, 2017, and which is herein incorporated by reference.

BACKGROUND OF THE INVENTION

Field of the Invention

The present invention relates to the field of constant velocity joints, and in particular here to cross-groove type constant velocity joints.

Description of the Background Art

Cross-groove type constant velocity joints have long been known. Thus, for example, in motor vehicles, cross-groove type plunging constant velocity joints, so-called VL joints, are used in drive shafts as plunging joints on the transmission side. In vehicles with rear wheel drive, use on the wheel side is also possible. Joints of this type are known from DE 103 52 408 A1, DE 103 53 608 A1, DE 10 2007 059 379 A1, and DE 10 2008 008 212 A1, for example.

Axially fixing the ball cage of such a VL joint results in a fixed joint, which can be used at operating angles of up to approximately 25°, depending on the implementation. In this design, the ball cage is normally guided on a cage guide surface that ensures that the joint can be pivoted while at the same time axially fixing the ball cage in place. Such cross-groove type fixed constant velocity joints are referred to as CG joints. Joints of this type are known from DE 10 2004 031 154 A1, DE 199 56 672 C1, DE 42 28 230 A1, and U.S. Pat. No. 6,497,622 A, for example.

Because of the different demands placed on these joint types, their components have heretofore been designed and dimensioned independently of one another. The use of identical parts across different joint types has hitherto been uncommon.

SUMMARY OF THE INVENTION

It is therefore an object of the present invention to provide remedy this situation.

To this end, a ball cage is proposed that is universally usable, both in a cross-groove type plunging constant velocity joint and in a cross-groove type fixed constant velocity joint, without compromising the joint-specific strength requirements or resulting in increased component dimensions.

The ball cage is distinguished in that it has an external contour with sections of different curvature, wherein axial edge sections of the external contour are designed as spherical sections located on the circumference of an imaginary sphere, and a center section of the external contour located axially between the edge sections runs radially inside the diameter of the imaginary sphere.

In a conventional CG joint, the external contour of the ball cage is continuously spherical in design. If one were to use such a conventional ball cage of a CG joint in a VL joint, the breaking load of the VL joint would decrease significantly. This could be remedied by an increase in the sphere diameter of the external contour of the ball cage. However, such an increase means that the corresponding cage guide surface on the outer joint part of the CG joint in the intermediate region between the ball races must be cut more deeply, i.e., the wrap of the balls by the ball races is reduced there. Such a reduction of the wrap would be disadvantageous for the service life properties of the CG joint. Conversely, a conventional ball cage, which is tailored to a VL joint, cannot be accommodated in a CG joint without collision, and would thus jam.

The solution according to an exemplary embodiment of the invention, creates a ball cage that can be used in both types of joint. Because of the modified external contour of the ball cage, it is possible to maintain the strength in the edge regions of the ball cage. At the same time, the ball race wrap of the balls in the outer joint part remains large, since the corresponding cage guide surface between the ball races can have a somewhat smaller inside diameter, and consequently the races remain more deeply cut into the outer joint part.

This is advantageous for a long service life of the joint, since the pressure ellipses of the balls in the ball races in the outer joint part can then spread out over a larger area. As a result, the surface pressure in the ball races decreases, and accordingly the risk of pitting decreases.

Thus, for example, the center section can be designed as a spherical section located on the circumference of a second imaginary sphere, wherein the diameter of the second sphere is smaller than the sphere diameter of the edge sections. As a result, the deflection of the joint is facilitated at small operating angles. The center section need not necessarily be designed as a spherical segment, but should in any case run between the two imaginary spheres.

Furthermore, the center points of the first and second imaginary spheres can coincide. This ensures that pivoting about a common center of rotation takes place at the contact points between the external contour of the ball cage and the corresponding cage guide surfaces on the outer joint part when the joint deflects, via which constraints are avoided and the friction in the joint remains low.

The differences in diameter between the edge sections and the center section can be chosen such that the maximum diameter of the ball cage is determined by the sphere diameter of the center section. This ensures that when the ball cage is axially fixed at the edge sections, radial support at the center section remains possible at the same time such that the ball cage can be inserted axially into the outer joint part coaxially to the same.

The center section can run in a region between the sphere diameter of the edge sections and a smaller sphere diameter, wherein the ratio of the larger sphere diameter to the smaller sphere diameter is 1.01 to 1.05. In this way, adequate operating angles at the joint on the order of up to approximately 25° can be achieved despite the larger sphere diameter at the edge sections, with no jamming between the edge sections and the cage guide surface for the center section.

In addition, provision can be made that the edge sections each transition continuously into the center section through a gradually curved transition section. The transition between the edge sections and the center section can thus be implemented with no edges or shoulders.

The edge sections of the external contour can be configured such that they each extend over an arc angle region with an arc length of 3° to 12.5°. In this design, the arc length can be matched to the maximum operating angles of the joints required in each case. For small maximum operating angles, the arc length can be made smaller.

Moreover, in such a case a sphere diameter can be chosen for the edge sections that tends to be somewhat larger in order to strengthen the ball cage in its edge regions.

As already mentioned, the above-described ball cage can be used in a CG joint. The result is then a cross-groove type fixed constant velocity joint with an outer joint part that has ball races, a cover that is fastened on the outer joint part, and a ball cage of the above-described type, wherein first cage guide surfaces, on which the edge sections of the ball cage are guided, are provided on the outer joint part and on the cover in order to axially fix the ball cage in the joint, and the outer joint part has a second cage guide surface on which the center section of the external contour of the ball cage is radially guided. As compared to a CG joint with a conventional ball cage having a spherical outer contour, the strength is increased for the same cylinder diameter.

The second cage guide surface on the outer joint part can be cylindrical in design so that the ball cage can be installed very simply through axial insertion into the outer joint part.

Furthermore, the same ball cage can be used in a VL joint. The result is then a cross-groove type plunging constant velocity joint, comprising an outer joint part with ball races on its inner circumference, an inner joint part with ball races on its outer circumference, wherein the ball races of the outer joint part and of the inner joint part are opposite one another in pairs and cross one another when the joint is not deflected, one ball for each pair of ball races, and a ball cage of the above-described type that is located between the outer joint part and the inner joint part and forms windows to accommodate the balls.

Depending on the design of the VL joint, the ball cage can have radial clearance to the outer joint part and the inner joint part, thus making it possible to reduce high-precision machining of the surfaces on the outer joint part and inner joint part that are opposite the outer contour and inner contour.

It is also possible, however, to radially guide the ball cage with the center section of its outer contour on a cage guide section of the outer joint part.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
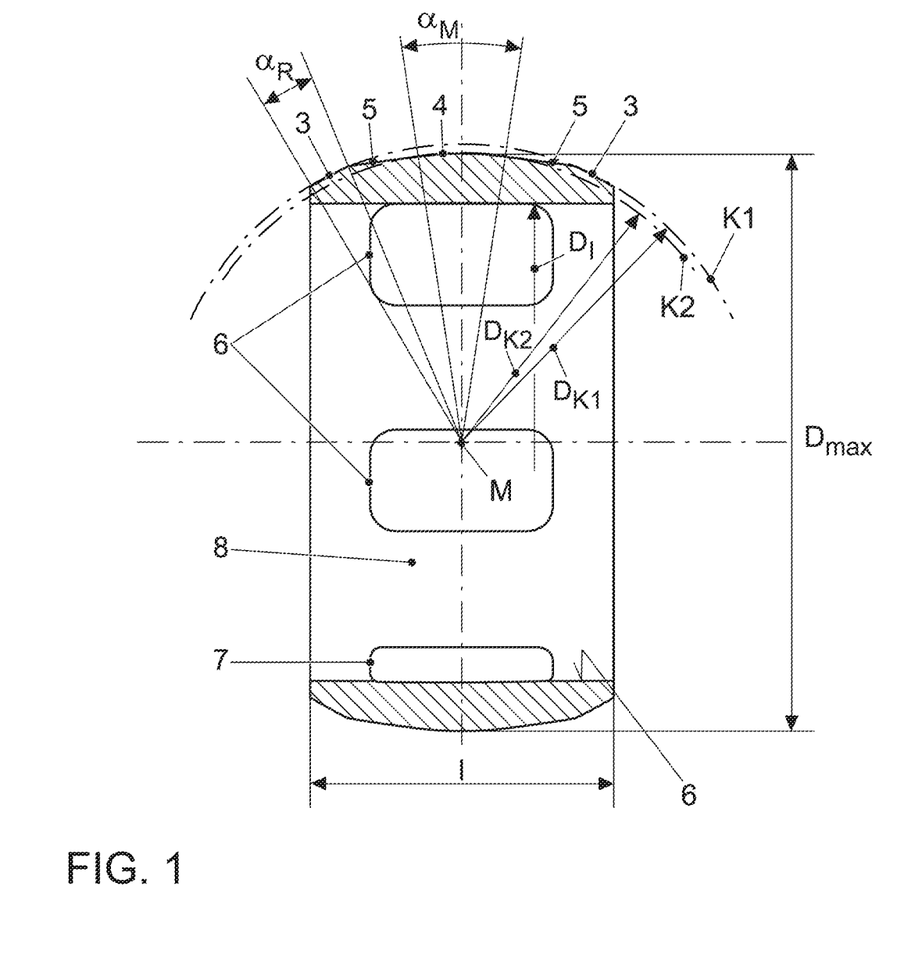
FIG. 1 is a sectional view of a ball cage according to an exemplary embodiment of the invention.

FIG. 1 shows an exemplary embodiment for a ball cage according to the invention that can be used universally with different types of cross-groove constant velocity joints. The ball cage 1 thus represents an identical part that can be used unchanged in manufacturing different types of constant velocity joints.

In the longitudinal section shown, the external contour 2 of the ball cage 1 has sections with different curvatures.

The external contour 2 includes two axial edge sections 3, which are each designed as spherical sections located on the circumference of an imaginary sphere K1, and accordingly each have an identical sphere diameter $D_{K1}$.

These edge sections 3 of the external contour each extend over an arc angle region whose arc length $\alpha_R$ can in each case be in the range from 3° to 15°, preferably 5° to 12.5°. The arc length $\alpha_R$ of the edge sections 3 is chosen as a function of the desired maximum operating angle of the joints.

Located axially between the edge sections 3 on the external contour 2 is a center section 4, which runs radially inside the diameter $D_{K1}$ of the imaginary sphere K1.

In this context, the center section 4 can likewise be designed as a spherical section located on the circumference of a second imaginary sphere K2, wherein the diameter $D_{K2}$ of the second sphere K2 is smaller than the sphere diameter $D_{K1}$ of the edge sections 3.

However, deviations from a strict spherical shape are also possible for the center section 4 as long as the curve remains between the two imaginary spheres K1 and K2.

The ball cage 1 is thus somewhat tapered in the region of its center section 4 as compared with the imaginary sphere K1.

In the case of a spherical design of the center section 4, the maximum diameter $D_{max}$ of the ball cage 1 is determined by the sphere diameter $D_{K2}$ of the center section 4.

The two imaginary spheres K1 and K2 preferably are arranged such that their center points coincide at a common point M.

As can additionally be seen in FIG. 1, edges or shoulders can be avoided in the transition from the edge sections 3 to the center section 4. Instead, the edge sections 3 each transition continuously into the center section 4 through a gradually curved transition section 5 in such a case. The transition section 5 remains between the two imaginary spheres K1 and K2.

The center section 4 of the external contour 2 preferably extends over an arc angle region whose arc length $\alpha_M$ can be in the range from 5° to 20°. The transition sections 5 have an arc length that can be in the range from 10° to 20° in each case.

In order to permit sufficient operating angles of up to approximately 25° on the one hand and to avoid jamming of the joint on the other hand, the sphere diameters $D_{K1}$ and $D_{K2}$ of the imaginary spheres K1 and K2 should not differ too greatly from one another. Preferably, therefore, the center section 4 runs in a region between the larger sphere diameter $D_{K1}$ of the edge sections 3 and a smaller sphere diameter $D_{K2}$, wherein the ratio of the larger sphere diameter $D_{K1}$ to the smaller sphere diameter $D_{K2}$ is 1.01 to 1.05.

To avoid excessive weakening of the edge sections 3, it can also be useful to limit the ratio of the axial cage length l to the larger sphere diameter $D_{K1}$ to a range from 0.7 to 0.8.

In this context it may also be advantageous to limit the ratio of the larger sphere diameter $D_{K1}$ to the maximum inside diameter $D_I$ of the ball cage 1 to a range from 1.2 to 1.3.

The corresponding inner contour 6 of the ball cage 1 can be designed to be cylindrical, i.e., with constant inside diameter $D_I$, as is shown by way of example in FIG. 1. It is also possible, however, to provide the inner contour 6 with a curvature that, if applicable, can be centered at the point M, but which preferably has a larger diameter of curvature.

For the sake of completeness, it should also be noted that the ball cage 1 has multiple windows 7 distributed in the circumferential direction to accommodate balls that are spaced apart from one another in the circumferential direction by web sections 8.

While the external contour 2 of the ball cage 1 is machined with a high surface quality, it is possible to omit finishing for improving the surface quality on the internal contour 6 after primary forming of the ball cage 1. The surface quality on the internal contour 6 thus will normally be lower than on the external contour 2.

A ball cage 1 of this type can be used in two different types of constant velocity joint, as shall be explained below on the basis of a CG joint 10 shown in FIGS. 2 and 3 and a VL joint 20 shown in FIGS. 4A and 4B.

Figure 2:
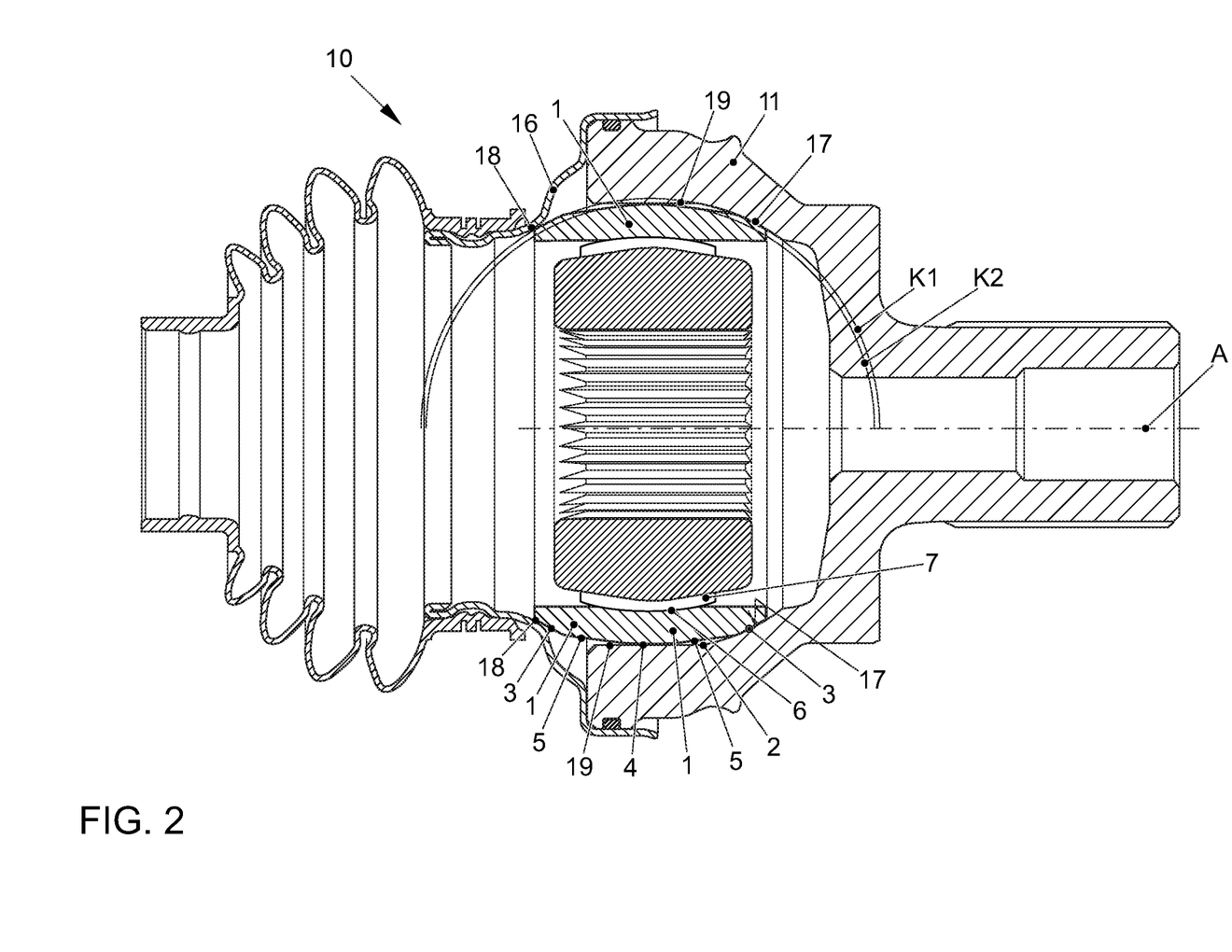
FIG. 2 is a sectional view of a CG joint according to an exemplary embodiment of the invention with a ball cage from FIG. 1.
Figure 3:
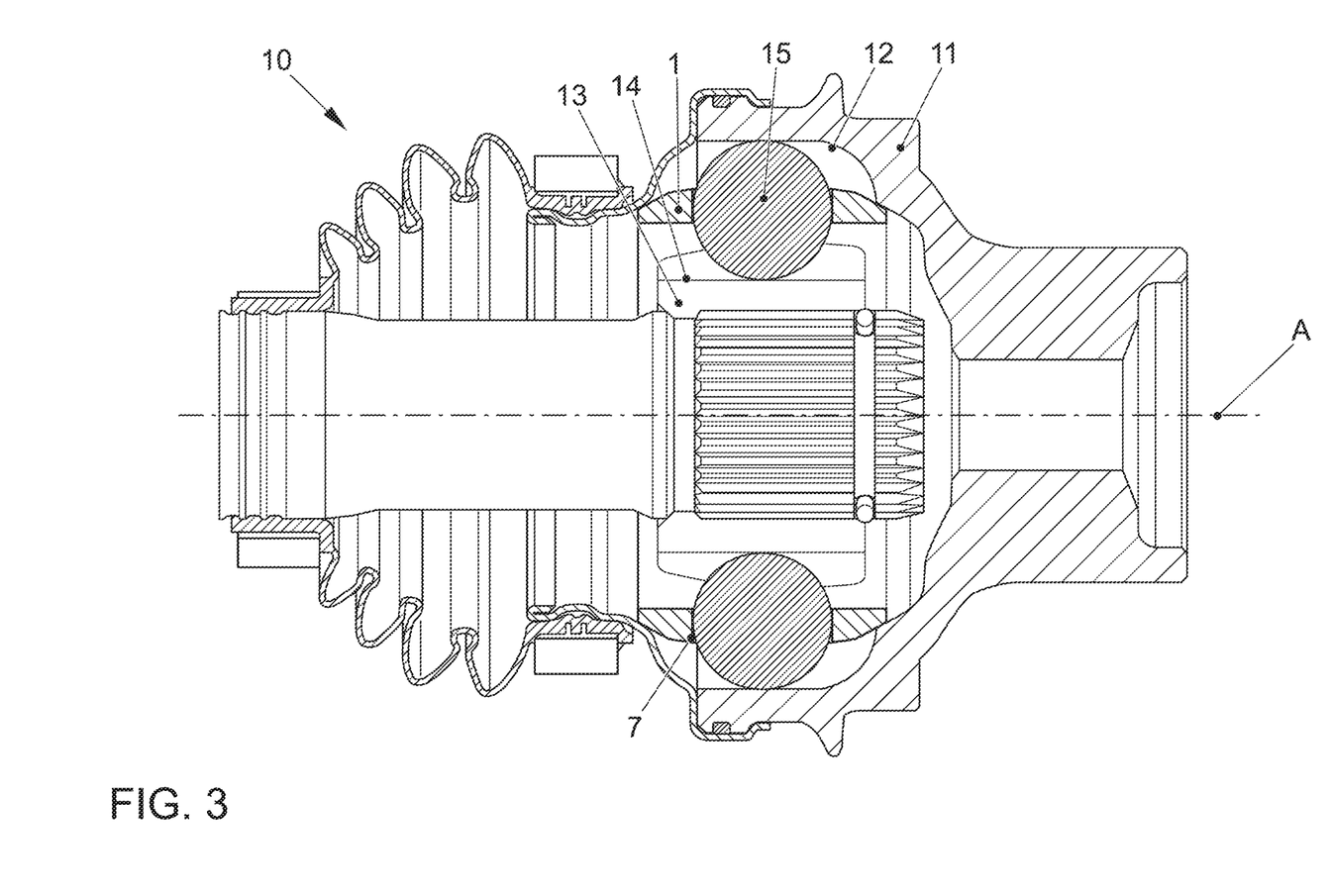
FIG. 3 is another sectional view of the CG joint from FIG. 2.

The exemplary embodiment in FIGS. 2 and 3 shows a cross-groove type fixed constant velocity joint 10 (CG joint), which can be used, for example, as the joint on the wheel side of a half shaft, in particular of a rear axle half shaft of a motor vehicle. Use on the transmission side is also fundamentally possible. The fixed constant velocity joint 10 explained in detail below can also be used for other purposes independent of a drive shaft, however.

The fixed constant velocity joint 10 according to the exemplary embodiment includes an outer joint part 11, which is provided with a multiplicity of ball races 12 on an inner circumferential surface. Accommodated in the outer joint part 11 is an inner joint part 13, which is likewise provided with a multiplicity of ball races 14 on an outer circumferential surface.

The ball races 12 and 14 on the outer joint part 11 and on the inner joint part 13 form pairs of ball races that each accommodate one ball 15 in order to radially support the two joint parts 11 and 13 on one another. In this design, the ball races 12 of the outer joint part 11 as well as the ball races 14 of the inner joint part 13 are angled relative to the applicable component central axis A. The angles of inclination to the central axis A of the fixed constant velocity joint 10 are equal in terms of magnitude, at least for corresponding ball races or even for all ball races 12 or 14, but differ in terms of sign for the outer joint part 11 and the inner joint part 13 so that the ball races 12 and 14 of a ball race pair cross.

Arranged between the outer joint part 11 and the inner joint part 13 is a ball cage 1 of the above-described type, which is pivotably mounted on the outer joint part 11 while at the same time being axially fixed. In this design, operating angles of up to 25° are possible on the joint 10. The ball cage 1 has a multiplicity of windows 7 to accommodate the balls 15 so that they are always held in a common plane, namely the half-angle plane of the joint 10, when the joint 10 is deflected. In addition, a cover 16 is fastened on the outer joint part 11.

The pivotability of the ball cage 1 is ensured through cage guide surfaces on the inner circumference of the outer joint part 11 and on the cover 16. In this design, the cage guide surfaces on the outer joint part 11 are implemented with no undercuts when viewed in the direction of the central axis A so that the ball cage 1 can be inserted axially into the outer joint part 11. If applicable, a lug can be provided on the outer joint part 11; the lug must be pushed over during assembly.

Provided on the outer joint part 11 and on the cover 16 are first cage guide surfaces 17 and 18, on which the edge sections 3 of the ball cage 1 are guided in order to axially fix the ball cage 1 in the joint 10.

In addition, the outer joint part 11 has a second cage guide surface 19, on which the center section 4 of the external contour 2 of the ball cage 1 is radially guided.

Preferably, the first and second cage guide surfaces 17 and 19 on the outer joint part 11 transition into one another.

For axial assembly, the center section 4 of the external contour 2 of the ball cage 1 first slides over the second cage guide surface 19, which preferably has no undercuts and which can be cylindrical in design for this purpose, until one of the edge sections 3 of the ball cage 1 comes into contact with the first cage guide surface 17. This first cage guide surface 17 may be spherically curved. The diameter of the curvature preferably corresponds approximately to that of the edge section 4 of the ball cage 1, so that full-area contact can be established.

The second cage guide surface 19 preferably transitions into the first cage guide surface 17 tangentially, but if applicable also through an edge. Instead of a curvature, other surface contours without undercuts may also be provided as a first cage guide surface 17 on the outer joint part 11, as long as they do not compromise the pivotability of the ball cage 1 in the desired operating angle range of the joint 10.

In this way, the ball cage 1 can be axially fixed in one direction. Axial securing in the opposite direction is accomplished by the cover 16, which is fastened on the outer joint part 11 after installation of the ball cage 1 has taken place. In the assembled state, the ball cage 1 is consequently fixed axially in one direction by the first cage guide surface 17 on the outer joint part 11 and in the opposite direction by the cage guide surface 18 on the cover 16.

The cage guide surface 18 on the cover 16 can also be designed as a spherical stop face. When the joint 10 is in the assembled state, the center points of the cage guide surfaces 17 and 18 on the outer joint part 11 and the cover 16 coincide. The ball cage 1 is pivotably guided thereon by its spherical edge sections 3. If the contact area between the cage guide surface 18 on the cover 16 and the ball cage 1 is very small, a spherical design of the cage guide surface 18 on the cover 16 is not strictly necessary. It may be sufficient simply to arrange it on an imaginary spherical surface about the center point of the spherical first cage guide surface 17 of the outer joint part 11 in order to accomplish the requisite axial securing of the ball cage 1 while ensuring pivotability.

In a variation from the exemplary embodiment shown, axial play can also be provided, albeit very small, measuring up to 4 mm. In this case, the result is a small offset of the rotational center points of the cage guide surfaces 17 and 18, which are not necessarily spherical.

Figure 4A:
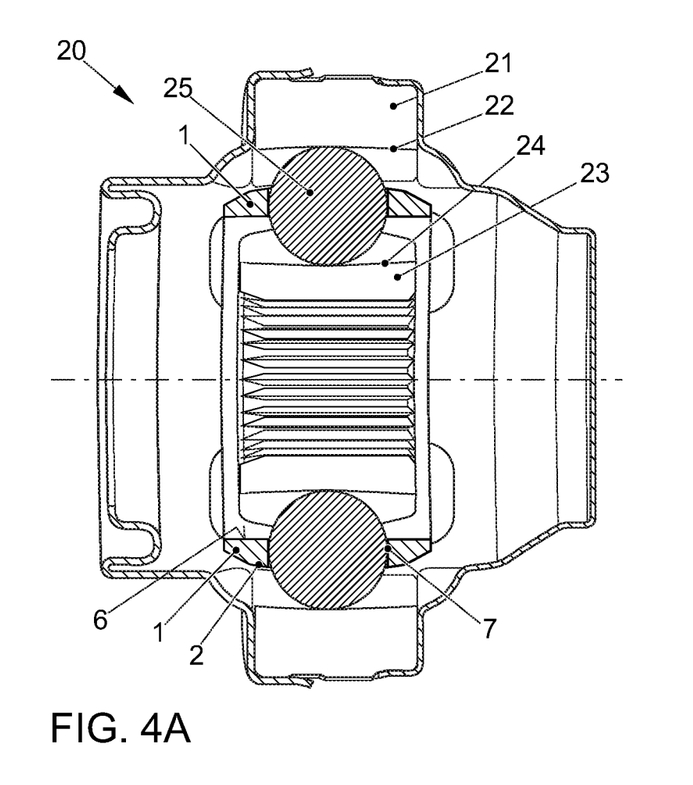
FIGS. 4A and 4B are sectional views of a VL joint according to exemplary embodiments of the invention with a ball cage from FIG. 1.
Figure 4B:
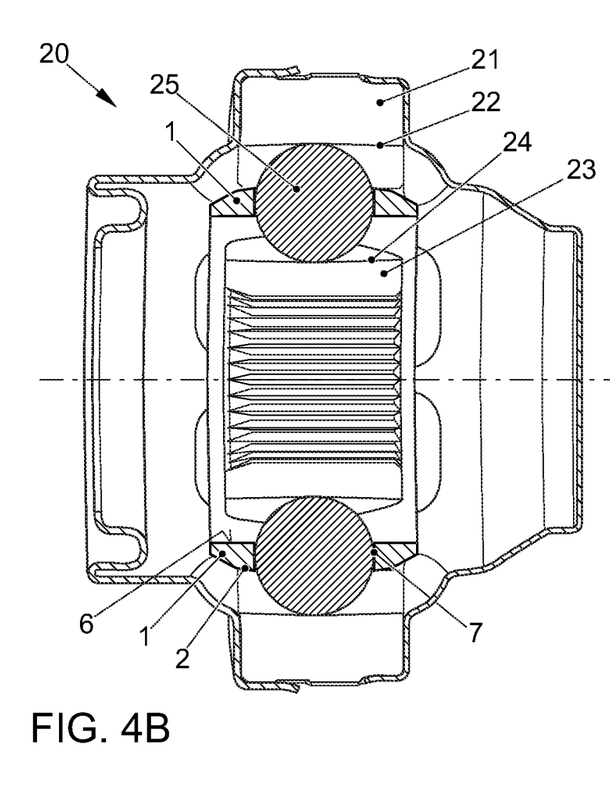

Lastly, FIGS. 4A and 4B show the use of the above-described ball cage 1 in a cross-groove type plunging constant velocity joint 20 (VL joint), which can be installed in a half shaft or a drive shaft of a motor vehicle, for example.

The VL joint 20 includes an outer joint part 21 and an inner joint part 23 located therein. Both the outer joint part 21 and the inner joint part 23 are provided on their circumferential surfaces, which face one another, with ball races 22 and 24, which are angled on the circumference relative to the applicable component central axis, as is also the case in the CG joint described above.

The ball races 22 and 24 are opposite one another in pairs, and in each case have opposing angles of inclination, so that the ball races 22 and 24 of a pair of ball races cross one another when the joint 20 is straight. One torque-transmitting ball 25 is accommodated in each ball race pair. The inclined ball races 22 or 24 can each be straight in and of themselves or can be helical about the central axis A. Moreover, the ball races of individual ball race pairs can also be designed without inclination.

Arranged between the outer joint part 21 and the inner joint part 23 is a ball cage 1 of the type described above, as is used identically in the CG joint 10. The ball cage forms a multiplicity of windows 7 to accommodate the balls 25.

In the exemplary embodiment shown here, the joint 1 has a total of six pairs of ball races with six balls 25. However, it is also possible to provide more or fewer pairs of ball races with a corresponding number of balls 25.

By means of the ball cage 1, the balls 25 are held essentially in a common plane that, when the joint is deflected, is perpendicular to the angle bisector of the component axes of the outer joint part 21 and inner joint part 23. Control of the balls 25 in this half-angle plane is accomplished through the crossed ball races 22 and 24.

In the case of the VL joint 20, the ball cage 1 is axially movable relative to the outer joint part 21 and the inner joint part 23, by which means the outer joint part 21 can be moved relative to the inner joint part 23, in order to permit axial length compensation in the VL joint 20, in contrast to the CG joint 10.

In the exemplary embodiment shown in FIG. 4A, the ball cage 1 is arranged so as to be loose between the outer joint part 21 and the inner joint part 23, which is to say that the ball cage 1 has some radial clearance to the outer joint part 21 and the inner joint part 23.

It is also possible, however, to radially guide the ball cage 1 on one of the joint parts 21 and 23. For example, as shown in FIG. 4B, the ball cage 1 can be radially guided on a cage guide section of the outer joint part 21 by the center section 4 of its external contour 2.

Generally speaking, it is advisable for the ball cage 1 to be guided closely to one of the two joint components, namely outer joint part 11 or 21 and inner joint part 13 or 23, preferably with a radial distance of 0.1 to 0.5 mm, and to have significantly greater clearance to the other of the two joint components, so that the joint is axially movable.

The invention was explained in detail above on the basis of an exemplary embodiment and additional variations. The exemplary embodiment and the variations serve to demonstrate the feasibility of the invention. Individual technical features that have been explained above in the context of other individual features can also be achieved independently of those features as well as in combination with still other individual features, even when this has not been expressly described, as long as this is possible in technical terms. The invention is thus expressly not limited to the specifically described exemplary embodiment and its variations, but instead includes all embodiments defined by the patent claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ball cage for a cross-groove type plunging constant velocity joint or a cross-groove type fixed constant velocity joint, the ball cage comprising:
    an external contour with sections of different curvature;
    axial edge sections of the external contour each formed as spherical sections and located on a circumference of a first imaginary sphere; and
    a center section of the external contour, located axially between the edge sections, runs radially inside a diameter of the first imaginary sphere,
    wherein the edge sections each transition continuously into the center section through a gradually curved transition section, such that the edge sections each extend over an arc angle region having an arc length that is smaller than an arc length of an arc angle region of the transition section.

2. The ball cage according to claim 1, wherein the center section is a spherical section located on a circumference of a second imaginary sphere, wherein a diameter of the second imaginary sphere is smaller than the diameter of the first imaginary sphere, or wherein the center section runs between the first and second imaginary spheres.

3. The ball cage according to claim 2, wherein center points of the first and second imaginary spheres coincide.

4. The ball cage according to claim 1, wherein a maximum diameter of the ball cage is determined by a sphere diameter of the center section.

5. The ball cage according to claim 1, wherein the edge sections of the external contour each extend over the arc angle region whose arc length is 3° to 15°.

6. The ball cage according to claim 1, wherein the center section runs in a region between the diameter of the first imaginary sphere and a smaller sphere diameter, and a ratio of the diameter of the first imaginary sphere to the smaller sphere diameter is 1.01 to 1.05.

7. A cross-groove type fixed constant velocity joint comprising:
    an outer joint part that has ball races;
    a cover that is fastened on the outer joint part; and
    a ball cage according to claim 1,
    wherein first cage guide surfaces on which the edge sections of the ball cage are guided, are provided on the outer joint part and on the cover in order to axially fix the ball cage in the joint, and
    wherein the outer joint part has a second cage guide surface on which the center section of the external contour of the ball cage is radially guided.

8. The cross-groove type fixed constant velocity joint according to claim 7, wherein the second cage guide surface on the outer joint part is cylindrical.

9. A cross-groove type plunging constant velocity joint comprising:
    an outer joint part with ball races on an inner circumference;
    an inner joint part with ball races on an outer circumference;
    balls held between the ball races of the outer joint part and the inner joint part; and
    a ball cage according to claim 1, which is located between the outer joint part and the inner joint part and includes windows to accommodate the balls.

10. The plunging constant velocity joint according to claim 9, wherein the ball cage has a radial clearance to the outer joint part and the inner joint part.

11. The plunging constant velocity joint according to claim 9, wherein the ball cage is radially guided on a cage guide section of the outer joint part by the center section of the external contour.

* * * * *